US009409577B2

(12) United States Patent
Kim (10) Patent No.: US 9,409,577 B2
(45) Date of Patent: Aug. 9, 2016

(54) METHOD AND APPARATUS FOR CONTROLLING TORQUE INTERVENTION OF HYBRID ELECTRIC VEHICLE

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 14/291,549

(22) Filed: May 30, 2014

(65) Prior Publication Data

US 2015/0151736 A1    Jun. 4, 2015

(30) Foreign Application Priority Data

Dec. 2, 2013  (KR) .................. 10-2013-0148732

(51) Int. Cl.
B60W 20/00     (2016.01)
B60W 30/18     (2012.01)
B60W 10/06     (2006.01)
B60W 10/08     (2006.01)

(52) U.S. Cl.
CPC ......... *B60W 30/18172* (2013.01); *B60W 10/06* (2013.01); *B60W 10/08* (2013.01); *B60W 20/10* (2013.01); *B60W 2510/244* (2013.01); *B60W 2540/10* (2013.01); *B60W 2710/0666* (2013.01); *B60W 2710/083* (2013.01); *Y02T 10/6286* (2013.01); *Y10S 903/93* (2013.01)

(58) Field of Classification Search
CPC ..... B60W 20/00; B60W 10/08; B60W 10/06; B60W 2710/083; B60W 10/02; B60W 2540/10; B60W 2540/12; B60W 2710/0666; B60W 10/115; B60W 20/30; B60W 2510/0208; B60W 2510/0216; B60W 2510/0619; B60W 2510/0623; B60W 2510/0652; B60W 2510/068

See application file for complete search history.

(56) References Cited

U.S. PATENT DOCUMENTS

| | | | | |
|---|---|---|---|---|
| 7,917,277 | B2 * | 3/2011 | Tabata ................. | B60K 6/445 180/65.21 |
| 2004/0089491 | A1 * | 5/2004 | Reuter ................. | B60K 6/445 180/287 |
| 2005/0182543 | A1 * | 8/2005 | Sah ..................... | B60K 6/365 701/51 |
| 2005/0272555 | A1 * | 12/2005 | Tabata ................. | B60W 10/02 477/2 |
| 2006/0196712 | A1 * | 9/2006 | Toyota ................. | B60K 6/445 180/165 |
| 2008/0236911 | A1 * | 10/2008 | Yamamoto ........... | B60W 10/06 180/65.265 |
| 2009/0111644 | A1 * | 4/2009 | Kaminsky ............ | B60K 6/445 477/5 |
| 2009/0118084 | A1 * | 5/2009 | Heap ................... | B60K 6/365 477/5 |
| 2009/0118086 | A1 * | 5/2009 | Heap ................... | B60W 10/06 477/5 |

(Continued)

*Primary Examiner* — Truc M Do
(74) *Attorney, Agent, or Firm* — Mintz Levin Cohn Ferris Glovsky and Popeo, P.C.; Peter F. Corless (57) ABSTRACT

A method and an apparatus for controlling torque intervention of a hybrid electric vehicle are provided that determine a final engine torque and a final motor torque considering efficiency of a hybrid system. The method includes calculating a demand torque of a driver, determining receipt of a signal of the torque intervention, and calculating the demand torque of the driver on which an intervention torque is reflected. In addition, the method includes calculating first operating points of the engine and the motor considering an efficiency of the hybrid system according to the demand torque of the driver on which the intervention torque is reflected, calculating a final engine torque and a final motor torque according to each of the first operating points of the engine and the motor, and adjusting a torque reduction using the final engine torque and the final motor torque.

13 Claims, 4 Drawing Sheets

(56) References Cited

U.S. PATENT DOCUMENTS

| | | | | |
|---|---|---|---|---|
| 2009/0118093 A1* | 5/2009 | Heap | B60W 10/06 | 477/110 |
| 2009/0118885 A1* | 5/2009 | Heap | B60W 10/06 | 701/22 |
| 2009/0118928 A1* | 5/2009 | Heap | B60K 6/365 | 701/54 |
| 2009/0118971 A1* | 5/2009 | Heap | B60K 6/445 | 701/102 |
| 2009/0204280 A1* | 8/2009 | Simon, Jr. | B60W 20/00 | 701/22 |
| 2009/0205886 A1* | 8/2009 | Supina | B60K 6/365 | 180/65.22 |
| 2009/0255746 A1* | 10/2009 | Boesch | B60K 6/365 | 180/197 |
| 2010/0022347 A1* | 1/2010 | Irie | B60K 6/445 | 477/3 |
| 2010/0023194 A1* | 1/2010 | Okubo | B60K 6/445 | 701/22 |

* cited by examiner

METHOD AND APPARATUS FOR CONTROLLING TORQUE INTERVENTION OF HYBRID ELECTRIC VEHICLE

CROSS-REFERENCE TO RELATED APPLICATION

This application claims priority to and the benefit of Korean Patent Application No. 10-2013-0148732 filed in the Korean Intellectual Property Office on Dec. 2, 2013, the entire contents of which are incorporated herein by reference.

BACKGROUND (a) Field of the Invention

The present invention relates to a method and an apparatus for controlling torque intervention of a hybrid electric vehicle. More particularly, the present invention relates to a method and an apparatus for controlling torque intervention of a hybrid electric vehicle that determines a final engine torque and a final motor torque by directly applying an intervention torque based on a torque intervention request to a demand torque of a driver and by simultaneously controlling torque reduction based on a demand torque of a driver.

(b) Description of the Related Art

Generally, a hybrid electric vehicle is driven by an engine that generates torque from fuel combustion and an electric motor that generates torque from an electric battery. The hybrid electric vehicle includes a hybrid control unit (HCU) that executes an engine operation of the hybrid electric vehicle, an engine control unit (ECU) that executes an operation of an engine, a motor control unit (MCU) that executes an operation of the driving motor, a transmission control unit (TCU) that executes an operation of the transmission, and a battery management system (BMS) that manages a condition of a battery. Among these controllers, the TCU is configured to request torque reduction while the hybrid electric vehicle is being shifted to prevent shift shock and protect a transmission.

A traction control system (TCS) is configured to prevent wheel spin when a vehicle starts or accelerates on a snowy or icy road by controlling a brake and an engine and improves driving stability. Thus, the TCS of the hybrid electric vehicle is also configured to request torque reduction while a tire of a hybrid electric vehicle is sliding on the snowy or icy road due to an overabundant driving torque during starting or acceleration of the vehicle.

A traditional control method of torque reduction of a hybrid electric vehicle using intervention torque implements a control logic that is the same as a control method of torque reduction used by a vehicle with a singular power source. The vehicle with a singular power source separates the ECU and the TCU/TCS, to allow the vehicle with a singular power source to execute torque reduction by comparing a torque instruction of the ECU with a torque instruction of the TCU/TCS and by collaborating the ECU with the TCU/TCS when the TCU/TCS has requested torque reduction.

Similarly, the hybrid electric vehicle controls torque reduction by considering torque instruction of an engine or a motor based on a demand torque of a driver when the HCU requests torque reduction based on an intervention torque. However, this developed control method executes torque reduction at the last step, so that the control method may not choose an operation point considering system efficiency. In addition, the control method may have a negative influence on the fuel efficiency since power of an engine and a motor is distributed for a corresponding request amount of an intervention torque in an allowable range of SOC.

The above information disclosed in this section is merely for enhancement of understanding of the background of the invention and therefore it may contain information that does not form the prior art that is already known in this country to a person of ordinary skill in the art.

SUMMARY

The present invention provides a method and an apparatus for controlling torque intervention of a hybrid electric vehicle having advantages of determining a final engine torque and a final motor torque considering efficiency of a hybrid system by directly applying an intervention torque based on a torque intervention request to a demand torque of a driver and by simultaneously executing torque reduction according to a demand torque of a driver.

An exemplary embodiment of the present invention provides a method of controlling torque intervention of a hybrid electric vehicle that may include calculating a demand torque of a driver, determining a signal of the torque intervention, calculating the demand torque of the driver on which an intervention torque is reflected when the signal of the torque intervention is determined, calculating first operating points of the engine and the motor considering efficiency of the hybrid system based on the demand torque of the driver on which the intervention torque is reflected, calculating a final engine torque and a final motor torque according to each of the first operating points of the engine and the motor, and executing a torque reduction using the final engine torque and the final motor torque.

The method may further include calculating second operating points of the engine and the motor based on the demand torque of the driver in response to determining no signal of the torque intervention. The calculation of the demand torque of the driver may include monitoring a vehicle speed, calculating a maximum torque and a minimum torque based on the vehicle speed, monitoring a value of an accelerator pedal position sensor (APS), and calculating the demand torque of the driver according to the value of the APS. The calculation of the final engine torque and the final motor torque may include filtering the engine torque and the motor torque, and distributing a system power to the engine torque and the motor torque according to an available condition of the hybrid system. The system power may be distributed according to a state of charge (SOC) of a battery, an amount of the motor use within an amount of available energy, and an amount of the engine use within a maximum torque of the engine.

Another exemplary embodiment of the present invention provides an apparatus of controlling torque intervention of a hybrid electric vehicle that may include a demand torque calculator configured to calculate a demand torque of a driver, a torque intervention requestor configured to output a signal of a torque intervention when a torque reduction is required, a system power distribution detector configured to detect an available condition of a hybrid system to distribute system power, and a hybrid controller configured to output a final engine torque and a final motor torque by calculating the engine torque and the motor torque based on the demand torque of the driver and the signal of the torque intervention and adjusting the engine torque and the motor torque according to the distributed system power.

The demand torque calculator may include a vehicle speed detector configured to detect a vehicle speed and an accelerator pedal position detector configured to detect an accelerator pedal position. The torque intervention requestor may include a transmission controller or a traction control system, wherein the transmission controller or the traction control system may be configured to request an intervention torque. The system power distribution detector may include an engine clutch configured to recognize a driving mode of the hybrid electric vehicle, an engine controller configured to detect an engine friction torque and an engine oil temperature while the hybrid electric vehicle is driven, and a motor controller configured to detect a motor temperature and a state of charge of a battery. The system power distribution detector may be configured to calculate a maximum output enable engine torque from the engine controller and a maximum output enable motor torque from the motor controller.

According to an exemplary embodiment of the present invention as stated above, the method and apparatus for controlling torque intervention considering a hybrid system may improve fuel efficiency and driving safety when a signal of torque intervention occurs.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, only certain exemplary embodiments of the present invention have been shown and described, simply by way of illustration. As those skilled in the art would realize, the described embodiments may be modified in various different ways, all without departing from the spirit or scope of the present invention.

Figure 1:
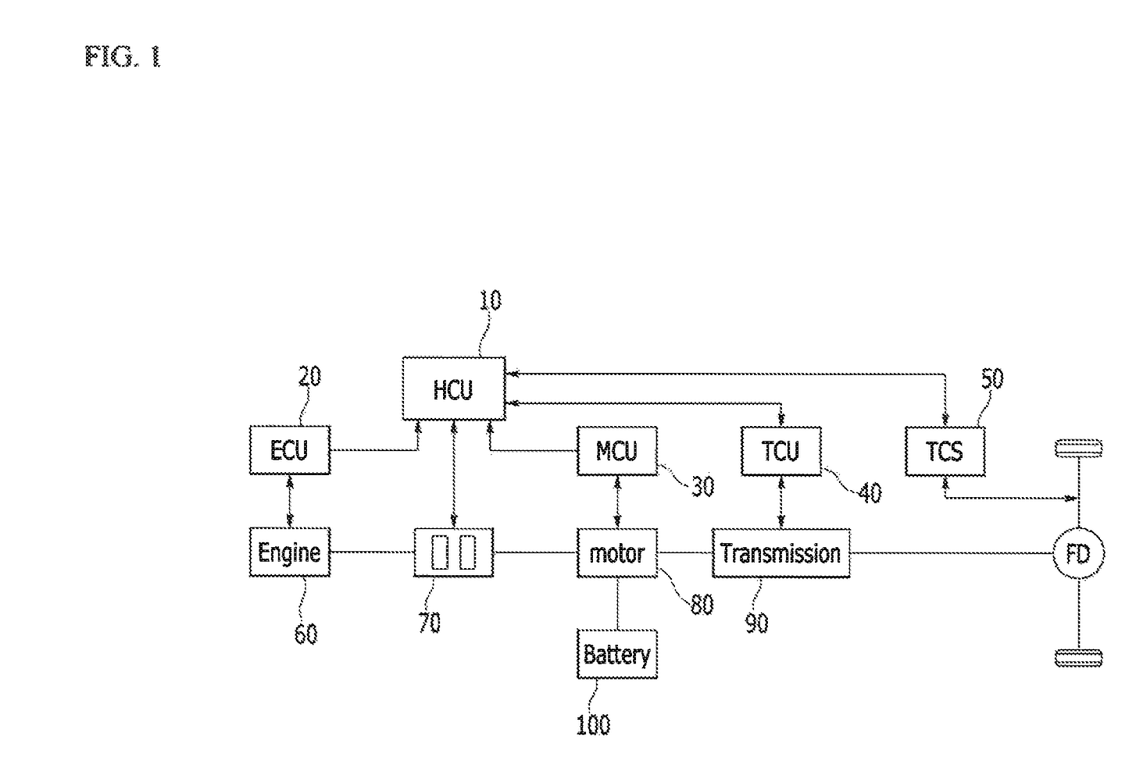
FIG. 1 is an exemplary diagram of a hybrid system to which a method of controlling torque intervention of a hybrid electric vehicle is applied according to an exemplary embodiment of the present invention.

An exemplary embodiment of the present invention will hereinafter be described in detail with reference to the accompanying drawings. FIG. 1 is an exemplary diagram of a hybrid system to which a method of controlling torque intervention of a hybrid electric vehicle is applied according to an exemplary embodiment of the present invention. The hybrid system as shown in FIG. 1 is an exemplary embodiment of the present invention for better comprehension and ease of description. Therefore, a method of controlling torque intervention of a hybrid electric vehicle according to an exemplary embodiment of the present invention may not only be applied to the hybrid system as shown in FIG. 1, but may also be applied to all other hybrid systems.

As shown in FIG. 1, the hybrid system to which the present invention is applied may include an HCU 10, an ECU 20, an MCU 30, a TCU 40, a TCS 50, an engine 60, an engine clutch 70, a motor 80, and a transmission 90.

The HCU 10 may be configured to operate other controllers which mutually exchange information in an entire operation of a hybrid electric vehicle, thus, the HCU 10 may be configured to execute output torque of the engine 60 and the motor 80 by cooperating with the other controllers. The ECU 20 may be configured to operate the engine 60 according to conditions of the engine 60 such as a demand torque of a driver, a coolant temperature, and an engine torque. The MCU 30 may be configured to operate the motor 80 according to a demand torque of a driver, a driving mode of hybrid electric vehicle, and as SOC condition of a battery 100. The TCU 40 may be configured to operate the transmission 90 such as speed ratios of the transmission 90 based on output torque of the engine 60 and the motor 80 and an amount of regenerative braking. The TCS 50 may be configured to adjust a driving torque of the vehicle to prevent slippage on a snowy or icy road when the vehicle starts or accelerates. In addition, the TCU 40 and the TCS 50 may cooperate with each other, and may adjust an output torque of the engine 60 by adjusting an amount of fuel injection, ignition timing, and a throttle valve. Further, the TCU 40 and the TCS 50 may simultaneously adjust output torque of the motor 80 by distributing system power.

The hybrid system as described above is obvious to a person of ordinary skill in the art, so that a detailed explanation thereof will be omitted.

Figure 2:
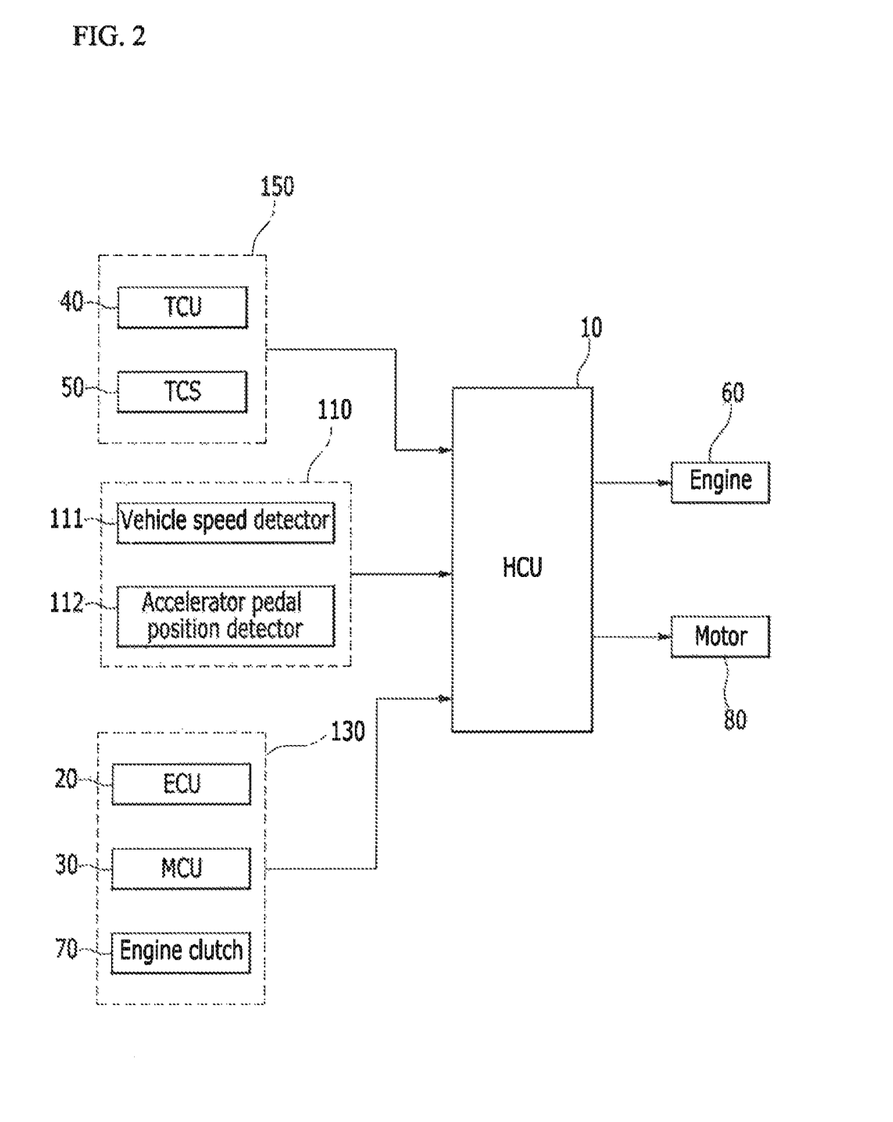
FIG. 2 is an exemplary block diagram of an apparatus for controlling torque intervention of a hybrid electric vehicle according to an exemplary embodiment of the present invention.

FIG. 2 is an exemplary block diagram of an apparatus for controlling torque intervention of a hybrid electric vehicle according to an exemplary embodiment of the present invention. The hybrid electric vehicle to which an exemplary embodiment of the present invention is applied may include at least one engine 60 and at least one motor 80. In addition, the hybrid electric vehicle may provide a driving mode in which the engine 60 and the motor 80 operate separately or simultaneously as power source.

As shown in FIG. 2, according to an exemplary embodiment of the present invention, an apparatus for controlling torque intervention of the hybrid electric vehicle may include a demand torque calculator 110, a torque intervention requestor 150, a system power distribution detector 130, and the HCU 10. The HCU 10 may be configured to operate the demand torque calculator 110, the torque intervention requester 150, and the system power distribution detector 130.

The demand torque calculator 110 may include a vehicle speed detector 111 and an accelerator pedal position detector 112. The vehicle speed detector 111 which may be mounted on a wheel of the vehicle may be configured to continuously detect a vehicle speed and transmit a monitoring signal to the HCU 10. The accelerator pedal position detector 112 may be configured to continuously detect a position value of an accelerator pedal and transmit a monitoring signal to the HCU 10. The position value of the accelerator pedal may be about 100% when the accelerator pedal is pressed fully (e.g., fully engaged), and on the contrary, the position value of the accelerator pedal may be about 0% when the accelerator pedal is not pressed at all (e.g., the pedal is disengaged).

When the position value of the accelerator pedal is greater than about 0%, the HCU 10 may be configured to determine that the driver intends to accelerate. Thus, the HCU 10 may be configured to recognize a minimum demand torque of the driver as about 0 Nm, and calculate a demand torque of the driver. On the other hand, when the position value of the accelerator pedal is about 0%, the HCU 10 may be configured to determine that a minimum demand torque of the driver is a creep torque which is a minimum torque according to creep driving of the vehicle.

The accelerator pedal position detector 112 may use an accelerator pedal position sensor (APS), or may use a throttle valve position sensor (TPS) mounted on an intake pipe. Therefore, in this specification and the scope of the appended claims, the accelerator pedal position sensor detector 112 may include the throttle valve position sensor as well as the accelerator pedal position sensor. Additionally, in this specification and the scope of the appended claims, the position value of the accelerator pedal should be understood to be an opening value of the throttle valve.

The torque intervention requestor 150 may include the TCU 40 and the TCS 50. The TCU 40 or the TCS 50 may be configured to request torque reduction while the vehicle is being shifted or the TCS 50 operating when the demand torque of the driver occurs according to the driver's intention. The torque intervention requestor 150 may be configured to output a signal of torque intervention to the HCU 10 when the TCU 40 or the TCS 50 requests torque reduction, to perform torque reduction. The intervention torque may not be a predetermined value, and may be a value of a necessary torque for preventing damage to the transmission or straightening a vehicle body.

The system power distribution detector 130 may include the engine clutch 70, the ECU 20, and the MCU 30. When the engine clutch 70 is open, torque reduction may be performed by the motor 80 since the hybrid electric vehicle is driven by the motor 80. Additionally, when the engine clutch 70 is locked, torque reduction may be performed by the engine 60 and the motor 80 simultaneously since the hybrid electric vehicle is driven by the engine 60 and the motor 80. Therefore, the system power distribution detector 130 may be configured to detect a state of the engine clutch 70 and transmit a signal of the condition to the HCU 10.

The ECU 20 may be configured to determine an operation state of the engine 60 by considering circumstance variables of the engine 60. The circumstance variables of the engine 60 may include a friction torque of the engine 60, an oil temperature of the engine 60, and the like. The friction torque of the engine 60 and the oil temperature of the engine 60 changed by an output torque of the engine 60, a coolant temperature, and a temperature of surrounding engine oil may be stored in a predetermined map.

The MCU 30 may be configured to determine an operation state of the motor 80 by considering circumstance variables of the motor 80. The circumstance variables of the motor 80 may include a temperature of the motor 80 and an SOC of the battery 100. The output torque of the motor 80 may be calculated from a current applied to the motor 80, and the current applied to the motor 80 may be calculated from the SOC of the battery 100.

The system power distribution detector 130 may be configured to detect a level of distribution of system power based on data from the engine clutch 70, the ECU 20, and the MCU 30. In addition, the system power distribution detector 130 may be configured to calculate a maximum available output engine torque and a maximum available output motor torque to adjust torque reduction by considering hybrid system efficiency. A value of a maximum available output torque of the hybrid electric vehicle may be the sum of the maximum available output engine torque and the maximum available output motor torque. Thus, the HCU 10 may be configured to distribute the engine torque and the motor torque substantially even though torque intervention occurs for adjusting torque reduction.

The HCU 10 may be configured to calculate a final engine torque and a final motor torque to adjust torque reduction using signals from the demand torque calculator 110, the torque intervention requestor 150, and the system power distribution detector 130. Accordingly, the HCU 10 may be implemented as at least one processor operated by a predetermined program, and the predetermined program may be programmed to perform each step of a method of controlling torque intervention of hybrid electric vehicle according to an exemplary embodiment of the present invention. The engine 60 and the motor 80 may operate according to the final engine torque and the final motor torque calculated by the HCU 10.

Figure 3:
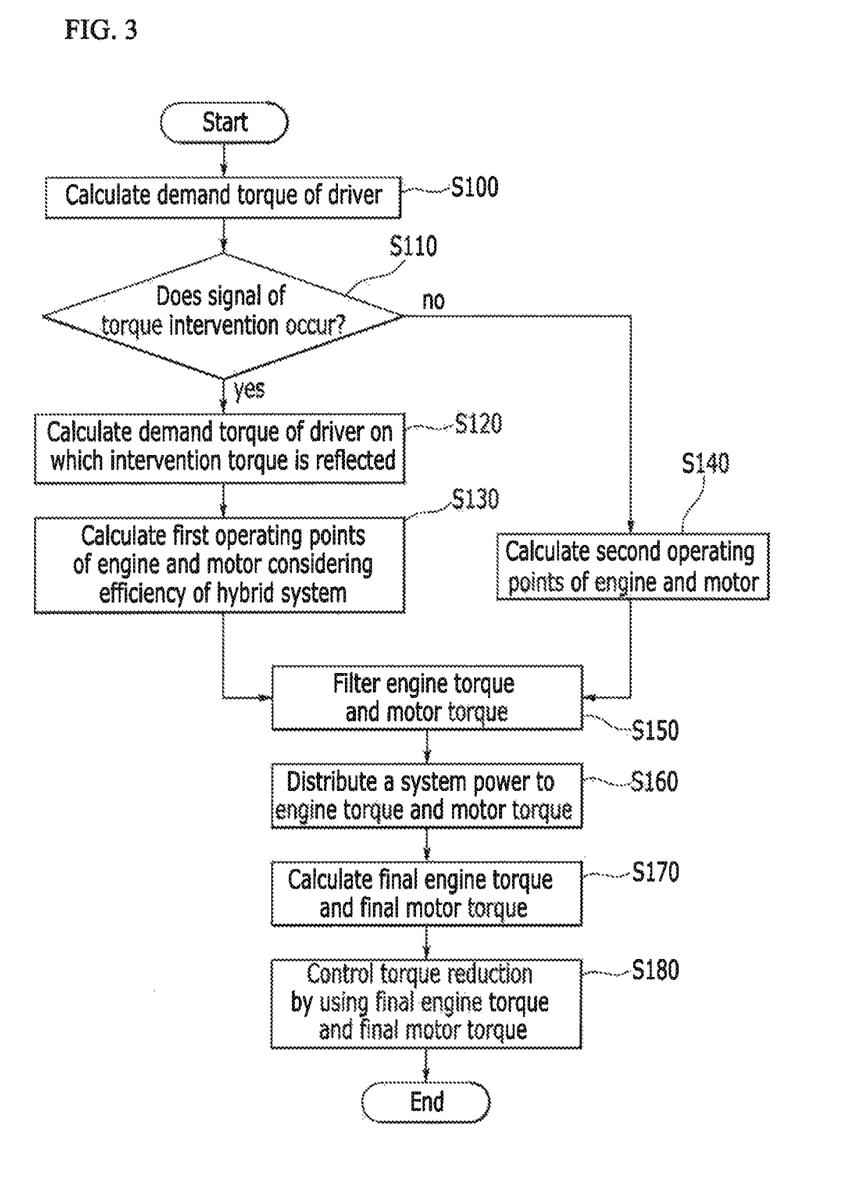
FIG. 3 is an exemplary flowchart showing a method of controlling torque intervention of a hybrid electric vehicle according to an exemplary embodiment of the present invention.

FIG. 3 is an exemplary flowchart showing a method of controlling torque intervention of a hybrid electric vehicle according to an exemplary embodiment of the present invention. As shown in FIG. 3, the method of controlling torque intervention of a hybrid electric vehicle according to an exemplary embodiment of the present invention may begin with calculating the demand torque of the driver at step S100.

Hereinafter, referring to FIG. 4, the step S100 that is the calculation of the demand torque of the driver will be described in detail.

Figure 4:
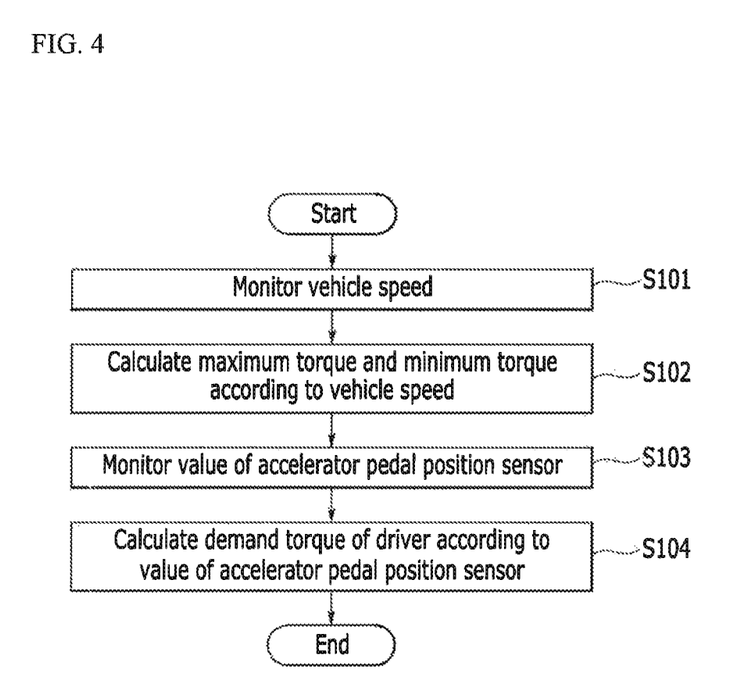
FIG. 4 is an exemplary flowchart showing partial steps of a method of controlling torque intervention of a hybrid electric vehicle in detail according to an exemplary embodiment of the present invention.

FIG. 4 is an exemplary flowchart showing partial steps of a method of controlling torque intervention of a hybrid electric vehicle in detail according to an exemplary embodiment of the present invention. The step S100 may include step S101 of monitoring a vehicle speed, step S102 of calculating a maximum torque and a minimum torque according to the vehicle speed, step S103 of monitoring a value of an accelerator pedal position sensor (APS), and step S104 of calculating the demand torque of the driver according to the value of the APS.

The vehicle speed detector 111 may be configured to detect the vehicle speed to recognize an operation state of the hybrid electric vehicle and an intention of the driver at step S101. The demand torque calculator 110 may be configured to calculate a maximum torque and a minimum torque according to the vehicle speed based on the operation state of the hybrid electric vehicle at step S102. Accordingly, the demand torque calculator 110 may use the data detected by the system power distribution detector 130. The maximum torque may be set as the sum of a maximum torque of the engine and a maximum torque of the motor, and the minimum torque may be set as a creep torque. As described above, the creep torque may be a minimum torque at which the vehicle moves even though the driver does not engage the accelerator pedal.

The accelerator pedal position detector 112 may be configured to monitor the position value of the accelerator pedal to recognize a driver's accelerating intention at step S103. The position value of the accelerator pedal may be set from about 0% to 100%. The demand torque calculator 110 may be configured to calculate the demand torque of the driver based on the position value of the accelerator pedal detected by the accelerator pedal position detector 112 at step S104. When the demand torque of the driver is calculated by performing the steps from step S101 to S104 and is transmitted to the HCU 10, the HCU 10 may be configured to determine whether a signal of torque intervention is received from the torque intervention requestor 150 at step S110.

When the signal of torque intervention is received at the step S110, the demand torque calculator 110 may be configured to calculate a demand torque of the driver on which intervention torque may be reflected and may be configured to transmit the demand torque of the driver on which intervention torque is reflected to the HCU 10 at step S120. After that, the HCU 10 may be configured to calculate first operating points of the engine 60 and the motor 80 based on efficiency of the hybrid system using data detected from the system power distribution detector 130 at step S130. On the other hand, when the signal of torque intervention is not received at the step S110, the HCU 10 may be configured to calculate second operating points of the engine 60 and the motor 80 based on the demand torque of the driver at step S140.

When first operating points of the engine 60 and the motor 80 based on efficiency of the hybrid system are calculated at the step S130 or second operating points of the engine 60 and the motor 80 are calculated at the step S140, filtering the engine torque and the motor torque may be performed at step S150. Generally, shift shock may occur in hybrid electric vehicle during TCU 40 shifting based on operating points of the engine 60 and the motor 80 when the operating points of the engine 60 and the motor 80 change substantially.

The HCU 10 may be configured to perform filtering of the engine torque and the motor torque to prevent the shift shock of the transmission 90 as stated above. The step S150 that filters the engine torque and the motor torque may reflect a shifting characteristic such as data of a present gear, an engine speed, a turbine speed, an open change amount of the throttle valve, and a speed change amount of the turbine. When the filtering of the engine torque and the motor is performed, the HCU 10 may be configured to distribute system power of the engine torque and the motor torque to improve hybrid system efficiency within a range of the engine maximum torque and the motor maximum torque transmitted from the system power distribution detector 130 at step S160.

As described above, the HCU 10 may be configured to distribute the engine torque and the motor torque by considering circumstance variables of the engine 60 and the motor 80, to more optimally manage the SOC of the battery. After that, the HCU 10 may be configured to calculate a final engine torque and a final motor torque distributed from the engine torque and the motor torque at step S170. When the final engine torque and the final motor torque are calculated at the step S170, the HCU 10 may be configured to adjust torque reduction by outputting signals of the final engine torque and the final motor torque to the engine 60 and the motor 80 on each at step S180.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A method of controlling torque intervention of a hybrid electric vehicle which includes an engine and a motor as power sources and a hybrid system that adjusts an engine torque and a motor torque, the method comprising:
   calculating, by a controller, a demand torque of a driver;
   determining, by the controller, whether a signal of the torque intervention has been received;
   calculating, by the controller, an adjusted demand torque of the driver on which an intervention torque is reflected in response to receiving the signal of the torque intervention;
   calculating, by the controller, first operating points of the engine and the motor based on efficiency of the hybrid system according to the adjusted demand torque of the driver on which the intervention torque is reflected;
   calculating, by the controller, a final engine torque and a final motor torque according to each of the first operating points of the engine and the motor; and
   adjusting, by the controller, a torque reduction using the final engine torque and the final motor torque.

2. The method of claim 1, further comprising:
   calculating, by the controller, second operating points of the engine and the motor according to the demand torque of the driver in response to no signal of the torque intervention being received.

3. The method of claim 1, wherein the calculation of the demand torque of the driver includes:
   monitoring, by a controller, a vehicle speed;
   calculating, by the controller, a maximum torque and a minimum torque based on the vehicle speed;
   monitoring, by the controller, a value of an accelerator pedal position sensor (APS); and
   calculating, by the controller, the demand torque of the driver based on the value of the APS.

4. The method of claim 1, wherein the calculation of the final engine torque and the final motor torque includes:
   filtering, by the controller, the engine torque and the motor torque; and distributing, by the controller, system power to the engine torque and the motor torque based on an available condition of the hybrid system.

5. The method of claim 4, wherein the system power is distributed according to a state of charge (SOC) of a battery, an amount of the motor use within an amount of available energy, and an amount of the engine use within a maximum torque of the engine.

6. An apparatus for controlling torque intervention of a hybrid electric vehicle which includes an engine and a motor as power sources and a hybrid system that adjusts an engine torque and a motor torque, the apparatus comprising:
a memory configured to store program instructions; and
a processor configured to execute the program instructions, the program instructions when executed configured to:
calculate a demand torque of a driver;
output a signal of torque intervention when torque reduction is required;
calculate an adjusted demand torque of the driver on which an intervention torque is reflected;
calculate first operating points of the engine and the motor based on efficiency of the hybrid system according to the adjusted demand torque of the driver on the which the intervention torque is reflected;
detect an available condition of the hybrid system to distribute system power;
output a final engine torque and a final motor torque calculated according to each of the first operating points of the engine and the motor; and
adjust the torque reduction using the final engine torque and the final motor torque based on the distributed system power.

7. The apparatus of claim 6, wherein the program instructions when executed are further configured to detect a vehicle speed and an accelerator pedal position detector configured to detect an accelerator pedal position.

8. The apparatus of claim 6, wherein the program instructions when executed are further configured to request the intervention torque.

9. The apparatus of claim 6, wherein the apparatus further includes:
an engine clutch configured to recognize a driving mode of the hybrid electric vehicle;
an engine control unit (ECU) configured to detect an engine friction torque and an engine oil temperature while the hybrid electric vehicle is driven; and
a motor control unit (MCU) configured to detect a motor temperature and a state of charge of a battery.

10. The apparatus of claim 9, wherein the program instructions are further configured to calculate a maximum available output engine torque from the ECU and a maximum available output motor torque from the MCU.

11. A non-transitory computer readable medium containing program instructions executed by a controller for controlling torque intervention of a hybrid electric vehicle which includes an engine and a motor as power sources and a hybrid system that adjusts an engine torque and a motor torque, the computer readable medium comprising:
program instructions that calculate a demand torque of a driver;
program instructions that output a signal of torque intervention when torque reduction is required;
program instructions that calculate an adjusted demand torque of the driver on which an intervention torque is reflected;
program instructions that calculate first operating points of the engine and the motor based on efficiency of the hybrid system according to the adjusted demand torque of the driver on which the intervention torque is reflected;
program instructions that detect an available condition of the hybrid system to distribute system power;
program instructions that output a final engine torque and a final motor torque calculated according to each of the first operating points of the engine and the motor; and
program instructions that adjust the torque reduction using the engine final torque and the final motor torque based on the distributed system power.

12. The non-transitory computer readable medium of claim 11, further comprising:
program instructions that detect a vehicle speed and an accelerator pedal position detector configured to detect an accelerator pedal position.

13. The non-transitory computer readable medium of claim 11, further comprising:
program instructions that request the intervention torque.

* * * * *